US012422787B2

(12) United States Patent
Sayem et al.

(10) Patent No.: US 12,422,787 B2
(45) Date of Patent: Sep. 23, 2025

(54) CONDUCTIVE WATCH HOUSING WITH SLOT ANTENNA CONFIGURATION

(71) Applicant: Garmin International, Inc., Olathe, KS (US)

(72) Inventors: Abu T. Sayem, Overland Park, KS (US); Tuan Quoc Phan, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 318 days.

(21) Appl. No.: 18/312,699

(22) Filed: May 5, 2023

(65) Prior Publication Data
US 2024/0111255 A1    Apr. 4, 2024

Related U.S. Application Data

(60) Provisional application No. 63/412,019, filed on Sep. 30, 2022.

(51) Int. Cl.
*G04R 60/08* (2013.01)
*G01S 19/14* (2010.01)
*G04B 37/00* (2006.01)

(52) U.S. Cl.
CPC .............. *G04R 60/08* (2013.01); *G01S 19/14* (2013.01); *G04B 37/0008* (2013.01)

(58) Field of Classification Search
CPC ........ G04R 60/08; G04R 60/10; G04R 60/12; G01S 19/14; G01S 19/36; G04B 37/0008; G04G 17/04; G04G 621/04; H01Q 1/273; G06Q 20/321
See application file for complete search history.

(56) References Cited

U.S. PATENT DOCUMENTS

| 9,977,406 | B2 * | 5/2018 | Fujisawa ................ G04R 60/06 |
| 10,271,299 | B1 | 4/2019 | Sayem et al. |
| 10,276,925 | B2 | 4/2019 | Han et al. |
| 10,484,958 | B2 | 11/2019 | Sayem et al. |
| 10,581,145 | B2 | 3/2020 | Han et al. |
| 11,018,432 | B2 * | 5/2021 | Varjonen ................ G04G 21/04 |
| 11,043,748 | B2 * | 6/2021 | Varjonen ............. H01Q 21/245 |
| 11,271,291 | B2 | 3/2022 | Hanshew et al. |

(Continued)

OTHER PUBLICATIONS

International Search Report and Written opinion from PCT/US2023/075728 dated Jan. 29, 2024.

*Primary Examiner* — Edwin A. Leon
(74) *Attorney, Agent, or Firm* — Samuel M. Korte; Max M. Ali

(57) ABSTRACT

A wrist-worn electronic device includes a lower housing, an upper housing, a plurality of bezel connectors, a first global navigation satellite system (GNSS) antenna, a second GNSS antenna, and a communication antenna. The lower housing includes a side wall. The upper housing includes a bezel. The bezel connectors each provide an electrical connection to the bezel. The first GNSS antenna is configured to receive a first GNSS wireless signal. The second GNSS antenna is configured to receive a second GNSS wireless signal. The communication antenna is configured to transmit and receive a communication wireless signal. Each antenna is formed from a portion of the circumference of the bezel, a portion of the circumference of the side wall, and two of the bezel connectors.

20 Claims, 12 Drawing Sheets

(56) References Cited

U.S. PATENT DOCUMENTS

| | | |
|---|---|---|
| 11,460,857 B1 | 10/2022 | Tan et al. |
| 11,592,577 B2 | 2/2023 | Sayem et al. |
| 11,853,015 B2 | 12/2023 | Atmatzakis et al. |
| 2015/0188217 A1 | 7/2015 | Tsai et al. |
| 2019/0131696 A1 | 5/2019 | Hanshew et al. |
| 2019/0215794 A1 | 7/2019 | Sayem et al. |
| 2021/0239847 A1 | 8/2021 | Sayem et al. |
| 2022/0283551 A1 | 9/2022 | Atmatzakis et al. |

\* cited by examiner

FIRST PORTION OF THE BEZEL
AND THE SIDE WALL FOR THE
FIRST GNSS ANTENNA

CONDUCTIVE WATCH HOUSING WITH SLOT ANTENNA CONFIGURATION

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/412,019, filed Sep. 30, 2022, and entitled "IMPROVED CONDUCTIVE WATCH HOUSING WITH SLOT ANTENNA CONFIGURATION." The Provisional Application is hereby incorporated by reference, in its entirety, into the current patent application.

BACKGROUND OF THE INVENTION

Wrist-worn electronic devices often include functionality that may be used to track wearers' current location, distance traveled, velocity, and other performance metrics or data. This functionality may be provided by receiving location signals from a satellite-based positioning system, such as the global navigation satellite system (GNSS). Often, greater accuracy is desired, which requires receiving location signals output by the satellite-based positioning system on two GNSS frequency bands or data channels. In addition, such devices may communicate wirelessly with other electronic devices, systems, or networks to monitor a user's activities and their performance during the activities, upload and download data, receive messages and information, and so forth. The communication protocols utilized to transmit and receive information may include Bluetooth, Wi-Fi, or telecommunications, such as cellular, signaling protocols. The electronic device may include three or more antennas that are utilized to receive location signals from GNSS satellites and communication signals to wirelessly communicate with other electronic devices, systems or networks.

SUMMARY OF THE INVENTION

Embodiments of the current technology provide a wrist-worn electronic device that includes at least three slot antennas that are configured to receive signals from GNSS satellites and wirelessly communicate with other electronic devices or telecommunication services. The electronic device comprises a lower housing, an upper housing, a plurality of bezel connectors, a first global navigation satellite system (GNSS) antenna, a second GNSS antenna, and a communication antenna. The lower housing includes a lower surface and a side wall formed of electrically conductive material with the side wall having a top surface. The upper housing opposes the lower housing and includes a bezel. The bezel is formed of an electrically conductive material and has a lower surface corresponding to the top surface of the side wall. The bezel connectors each provide an electrical connection to the bezel. The first GNSS antenna is configured to receive a first GNSS wireless signal having a first frequency and to conduct a first location electronic signal having the first frequency. The first GNSS antenna is formed by a first portion of a circumference of the bezel, a first portion of a circumference of the side wall, a first bezel connector positioned at a first end of the first portion of the circumference of the bezel and a first end of the first portion of the circumference of the side wall, and a second bezel connector positioned at a second end of the first portion of the circumference of the bezel and a second end of the first portion of the circumference of the side wall. The second GNSS antenna is configured to receive a second GNSS wireless signal having a second frequency and to conduct a second location electronic signal having the second frequency. The second GNSS antenna is formed by a second portion of the circumference of the bezel having a first end and an opposing second end, a second portion of the circumference of the side wall having a first end and an opposing second end, the first bezel connector, and a third bezel connector positioned at the second end of the second portion of the circumference of the bezel and the second end of the second portion of the circumference of the side wall. The communication antenna is configured to wirelessly transmit and receive a communication signal having a third frequency and to conduct a communication electronic signal having the third frequency. The communication antenna is formed by a third portion of the circumference of the bezel partially overlapping with the second portion of the circumference of the bezel, the third portion of the circumference of the bezel having a first end and an opposing second end, a third portion of the circumference of the side wall partially overlapping with the second portion of the circumference of the side wall, the third portion of the circumference of the side wall having a first end and an opposing second end, the first bezel connector, and a fourth bezel connector positioned at the second end of the third portion of the circumference of the bezel and the second end of the third portion of the circumference of the side wall.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current technology are described in detail below with reference to the attached drawing figures, wherein.

Figure 1:
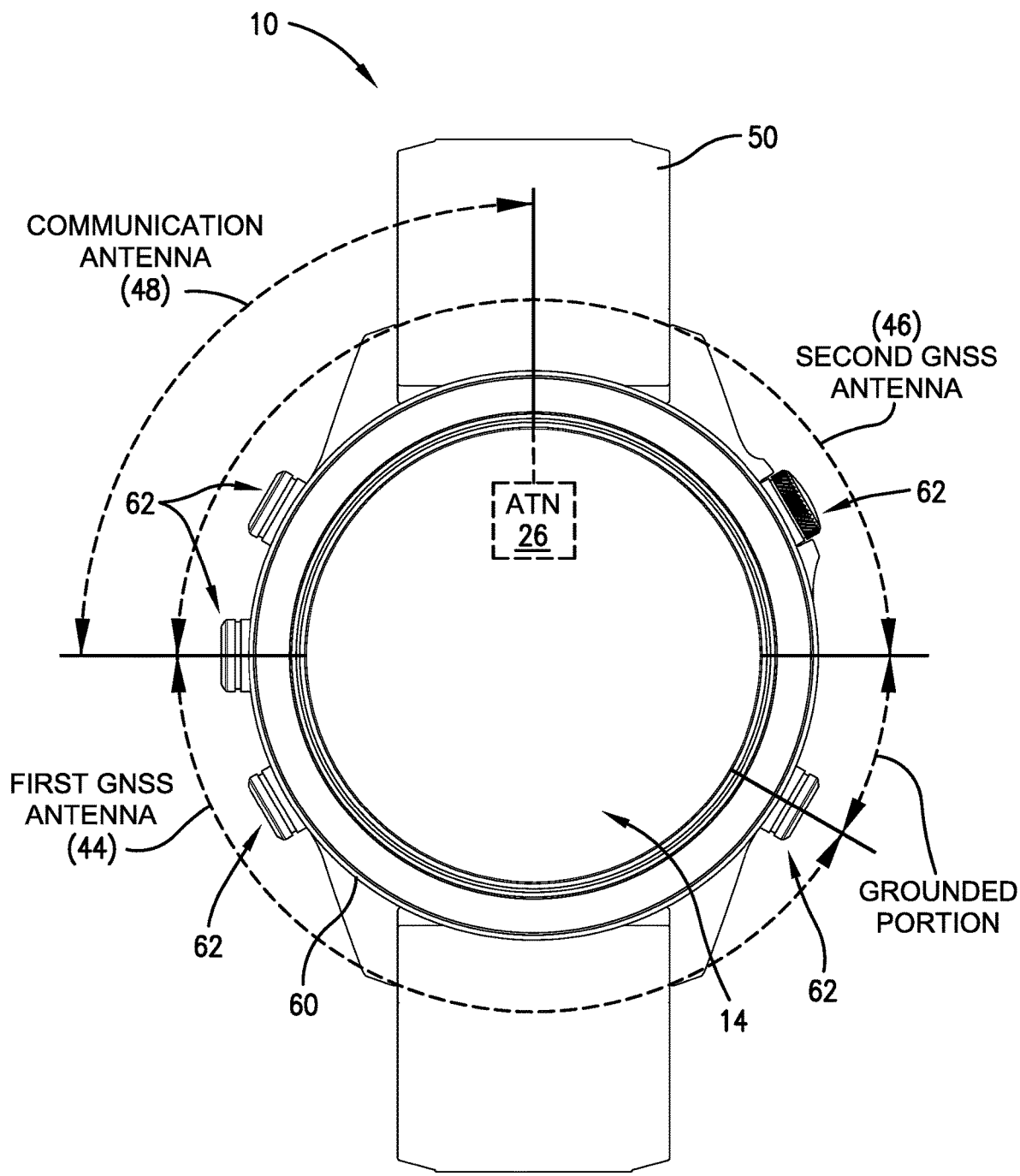
FIG. 1 is a top plan view of an electronic device, constructed in accordance with various embodiments of the current technology, configured to receive location signals having two GNSS frequency bands and transmit and receive communication signals using one or more protocols.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current technology is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Embodiments of the present technology relate to an electronic device that can be worn on a user's wrist and that wirelessly communicates with other devices, systems, and networks. The electronic device may be a fitness watch, a wrist-worn smart phone, a wrist-worn navigation device, or other wearable multi-function electronic devices that include a housing and a wrist band, strap, or other attachment mechanism. Although the electronic device is typically worn on a wrist, it may also be worn on other parts of the body such as an extremity, the forearm or the upper arm. The electronic device may be used to determine the user's current location, distance traveled, velocity, and other performance metrics by receiving location signals from a satellite-based positioning system such as the global navigation satellite system (GNSS). In embodiments, the wrist-worn device may receive GNSS location signals from the satellite-based positioning system having a single band of frequencies. In other embodiments, in order to further improve the accuracy of the location determination and related performance metrics, the electronic device may be configured to wirelessly receive GNSS signals having two separate frequency bands, such as the L1 and L5 GPS bands. In addition, the electronic device may be electronically paired and communication with other devices, such as a heart rate monitor that is typically worn around the user's chest, a foot pod attached to the user's shoe for measuring jogging or running cadence and distance, a bike speed and cadence sensor attached to a crank arm or a wheel hub of the user's bicycle for determining and tracking cycling performance, and so forth. Furthermore, the electronic device may be able to communicate with smartphones, tablets, laptop or desktop computers, Wi-Fi routers, cell towers, and the like, to allow the user to transmit (upload) location and activity data, download apps, stream (continuously download) music, receive text messages, emails, and weather alerts, and so on. Thus, the electronic device may receive and/or transmit, utilize or process location signals, such as GNSS signals output by a satellite system, or communication signals, such as signals that utilize Bluetooth™, Wi-Fi, or telecommunication cellular protocols, and so forth. Typically, each type of signal, and in some cases protocol, may require use of separate antennas, within the housing or the bezel of the device, to wirelessly transmit and/or receive various signals.

When the electronic device is embodied by a wrist watch, some wearers prefer a housing and bezel, which may be an annular ring that surrounds the watch display, formed of electrically conductive materials. In contrast, non-conductive materials, such as plastic, are commonly used in the housing of conventional wrist watches. Thus, to make the watch more fashionable, the housing and bezel may be formed from metals and/or metal alloys. For electronic devices that implement wireless communication, it is good practice to have the antennas to positioned away from electronic circuitry in the watch, such as a location determining element, a communication element or a processing element that process(es) the electronic signals and provide other functionality. Some known conventional wrist-worn devices place or incorporate one or more antennas on an outer surface of or within walls of the housing. However, given that the walls of the watch housing and bezel may be desired to be formed of electrically conductive material (metal and/or metal alloys), the one or more antennas typically cannot be placed or incorporated on or within the housing walls or bezel because it can be challenging to isolate the one or more antennas from the remainder of the housing walls or bezel and inadequate isolation of the one or more antennas can lead to undesirable interference with the signals being wirelessly transmitted or received by the device. Therefore, it is a challenge to design and build a wrist-worn electronic device having a metal housing and bezel that is capable of wirelessly receiving and/or transmitting electrical signals (e.g., receiving multiple GNSS signals, communicating with Bluetooth™, Wi-Fi, or cellular devices or systems, etc.).

The electronic device of the current technology has a housing and bezel formed of electrically-conductive material (metal and/or metal alloys) and is configured to wirelessly receive GNSS signals and communicate with other devices or systems using multiple communication protocols. The electronic device addresses the above-discussed challenges by implementing certain improvements that enable incorporation of a first GNSS antenna for receiving GNSS location signals in a first frequency band, a second GNSS antenna for receiving GNSS location signals in a second frequency band, and a communication antenna for transmitting and receiving communication signals using Bluetooth™, Wi-Fi, or cellular protocols. Specifically, portions of the electrically-conductive housing and bezel can be used to form components of one or more slot-type antennas, which each include an upper conductor and a spaced apart lower conductor with left and right side conductors connecting the upper conductor and the lower conductor. The space between the upper and lower conductors forms the slot of each antenna, wherein a width of each slot corresponds to a wavelength of the wireless signal being received and/or transmitted by the respective antenna. The housing side wall can act as the lower conductor and the bezel can act as the upper conductor of the slot antenna because the electronic device further includes a housing insulating ring which is positioned between a side wall of the housing and a lower edge of the bezel and is formed from electrically non-conductive material, such as plastic or other isolation materials or fillers. For a wrist-worn device having a housing that has a circular shape, the housing insulating ring is annular in shape. Similarly, for a wrist-worn device having a housing that has a substantially rectangular shape, the housing insulating ring is substantially rectangular in space. Thus, the housing insulating ring fills the space between the upper and lower conductors of the slot antennas. Two electrically conductive connectors, which electrically couple (connect) the electrically-grounded side wall(s) of the housing with the bezel through the housing insulating ring, form the left side conductor and right side conductor, respectively, of each slot antenna.

Figure 2:
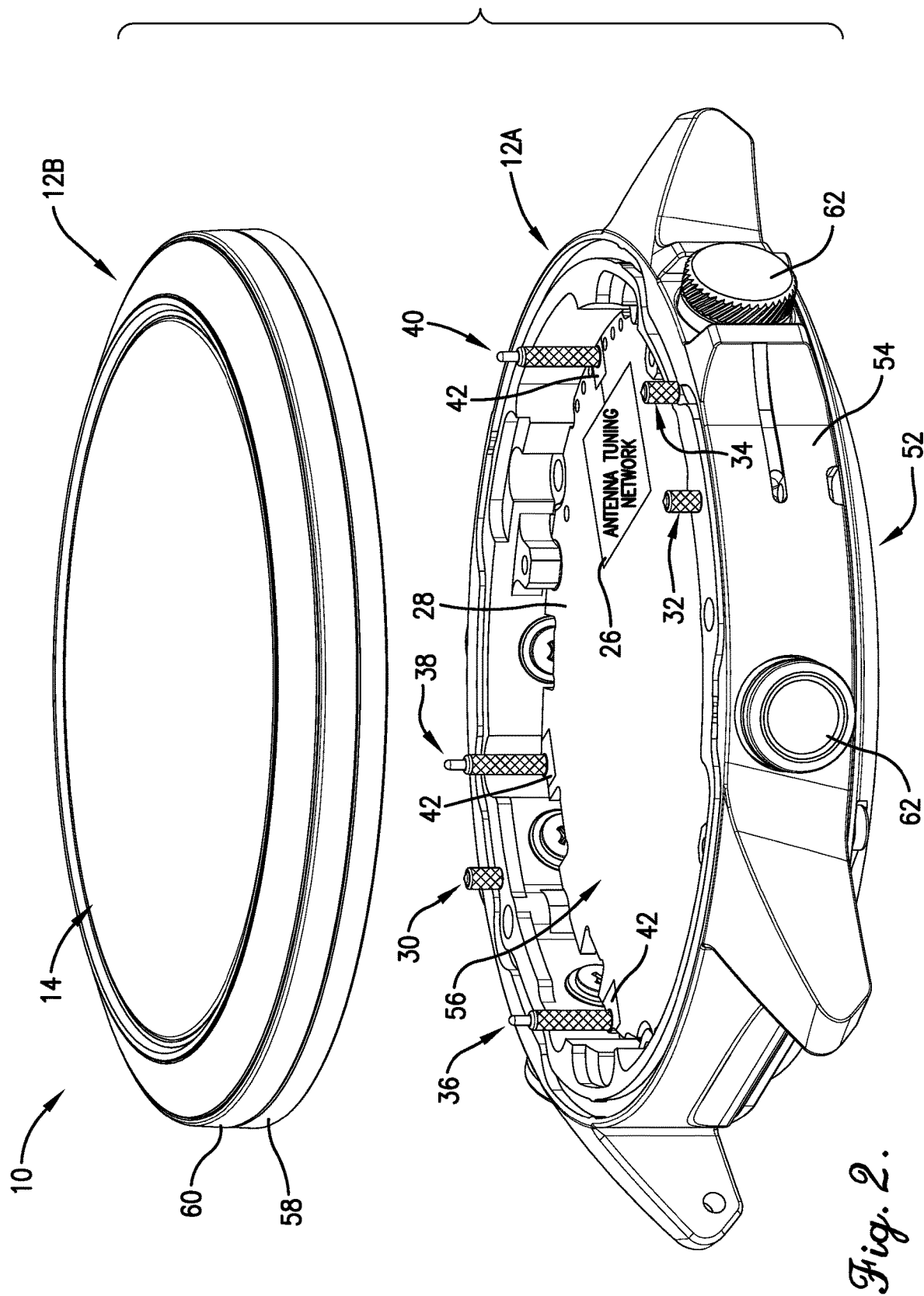
FIG. 2 is a perspective exploded view of the electronic device with a display, a bezel, and a housing insulating ring removed from a lower housing to reveal an internal cavity and a plurality of connectors.
Figure 3:
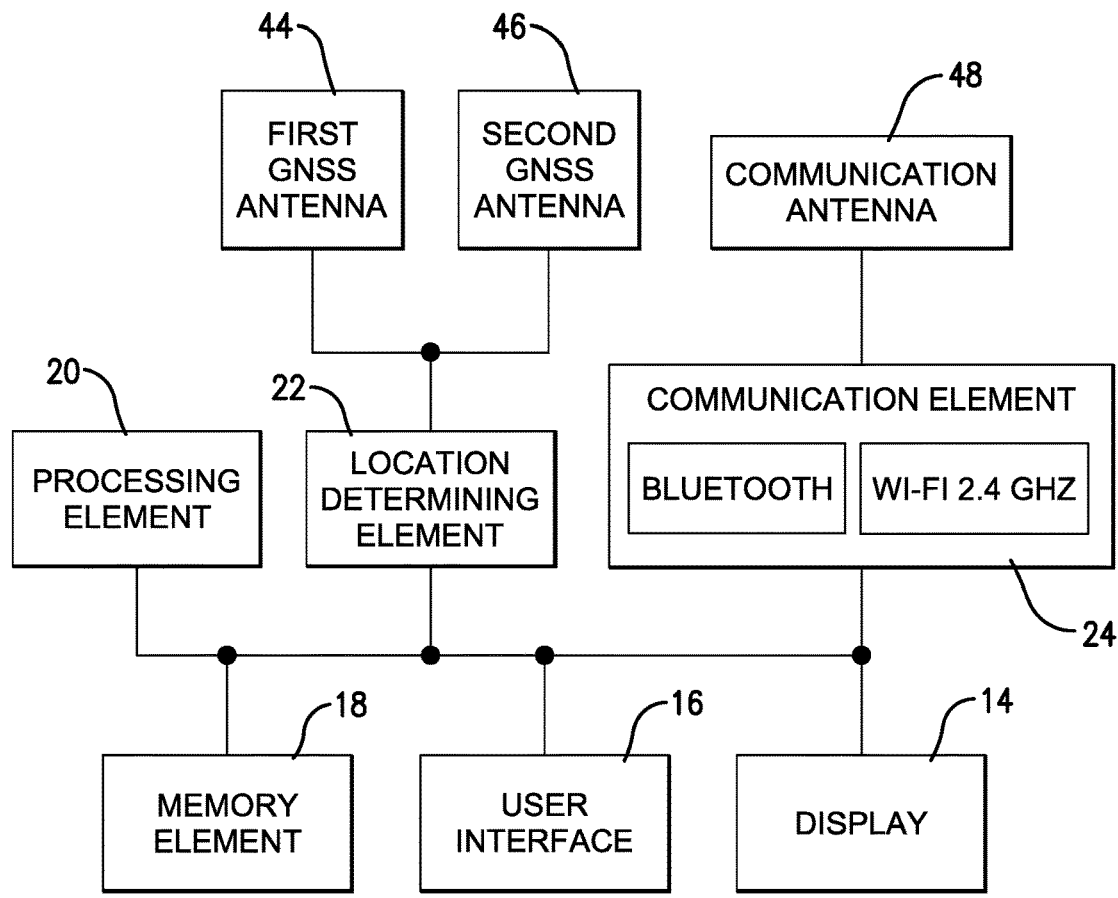
FIG. 3 is a schematic block diagram of various electronic components of the electronic device.

Embodiments of the technology will now be described in more detail with reference to the drawing figures. Referring initially to FIGS. 1-3, a wrist-worn electronic device 10 is illustrated. The electronic device 10 broadly comprises a housing 12, a display 14, a user interface 16, a memory element 18, a processing element 20, a location determining element 22, a communication element 24, an antenna tuning network 26, a printed circuit board 28, a first bezel (ground) connector 30, a second bezel (ground) connector 32, a third bezel (ground) connector 34, a fourth bezel (signal) connector 36, a fifth bezel (signal) connector 38, a sixth bezel (signal) connector 40, a plurality of printed circuit board connectors 42, a first global navigation satellite system (GNSS) antenna 44, a second GNSS antenna 46, and a communication antenna 48. The electronic device 10 may also include a wrist band 50, a strap, or other attachment mechanisms.

The housing 12, as shown in FIGS. 1 and 2, generally houses or retains other components of the electronic device 10 and may include or be coupled to the wrist band 50. The housing 12 is generally divided into a lower housing 12A and an upper housing 12B. The lower housing 12A includes a bottom wall 52, at least one side wall 54, and an internal cavity 56. The bottom wall 52 includes a lower, outer surface that contacts an upper surface of the user's wrist while the user is wearing the electronic device 10. The side wall 54 couples to the bottom wall 52 at a lower edge of the side wall 54. In exemplary embodiments that are shown in the figures, the lower housing 12A includes a single side wall 54, with inner and outer surfaces, that has a circular or ring shape which generally forms the internal cavity 56 in combination with the bottom wall 52 and the upper housing 12B. In other embodiments, the side wall 54 may have a substantially rectangular, oval or elliptical shape. In still other embodiments, the lower housing 12A may include a plurality of side walls which form a substantially geometric or polygonal shape, such as triangular, square or rectangular, hexagonal, octagonal, and so forth. In various embodiments, the side wall 54 may include a plurality of through holes, each of which passes from the outer surface to the inner surface of the side wall 54 through which one or more pushbuttons 62 may pass. The lower housing 12A is formed from electrically conductive materials, such as metals and/or metal alloys, which are also electromagnetically radiating.

The upper housing 12B includes a housing insulating ring 58 and a bezel 60. The housing insulating ring 58 and the bezel 60 are generally shaped to correspond to or match the shape of the side wall 54 of the lower housing 12A. Bezel 60 forms a central opening through which the display 14 is visible. Thus, in exemplary embodiments, the housing insulating ring 58 has an annular shape having a circular circumference or perimeter to corresponding to the outer edge of the side wall 54 and a circular inner circumference or perimeter corresponding to the central opening formed by bezel 60. In addition, the housing insulating ring 58 includes a circular central opening that gives the housing insulating ring 58 an annular shape with a small thickness. The housing insulating ring 58 includes an upper surface and a lower surface that are each generally planar. The housing insulating ring 58 is formed from electrically non-conductive (insulating) material such as plastic polymers or the like. The housing insulating ring 58 is positioned above the side wall 54 of the lower housing 12A such that the lower surface of the housing insulating ring 58 contacts an upper surface of the side wall 54. The housing insulating ring 58 further includes a plurality of holes or openings extending from the upper surface to the lower surface, through which the bezel connectors 30, 32, 34, 36, 38, 40 are positioned and pass. The housing insulating ring 58 provides electrical isolation between the side wall 54 of the lower housing 12A and the bezel 60 of the upper housing 12B.

The bezel 60 is generally shaped to match the shape of the housing insulating ring 58 and the side wall 54, giving the bezel 60 a circular circumference or perimeter. In addition, the bezel 60 includes a circular central opening through which the display 14 is visible—which gives the bezel 60 an annular shape with a small thickness. The bezel 60 includes an upper surface, which in exemplary embodiments, may be substantially planar, tilted or slanted, and a lower surface that is generally planar. The bezel 60 is formed from electrically conductive materials, such as metals and/or metal alloys. The bezel 60 is positioned above the housing insulating ring 58 and the lower housing 12A such that the outer circumference of the bezel 60 is aligned with the outer circumference of the housing insulating ring 58, which is aligned with the outer circumference of the side wall 54.

The display 14 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The display 14 may include a screen on which information is presented, with the screen possessing any one of a variety of shapes, such as a square or a rectangular aspect ratio that may be viewed in either a landscape or a portrait mode. In some embodiments, the display 14 may further include a lens and other components overlying the viewing area, which may enhance the visibility of the information shown on the display 14. In various embodiments, the display 14 may also include a touch screen occupying the entire screen or a portion thereof so that the display 14 functions as part of the user interface 16. The touch screen may allow the user to interact with the electronic device 10 by physically touching, swiping, or gesturing on areas of the screen. The display 14 may be in communication electronic with the memory element 18 and the processing element 20 and may receive data or information therefrom that is to be shown on the display 14. In exemplary embodiments, the display 14 is generally surrounded by the bezel 60.

The user interface 16 generally allows the user to directly interact with the electronic device 10 and may include pushbuttons, rotary knobs, or the like. In exemplary embodiments of FIGS. 1 and 2, the housing 12 may include one or more pushbuttons 62 and/or rotary knobs located in the through holes of the side wall 54 that function as at least a portion of the user interface 16. The user interface 16 may allow the user to scroll through menus or change screens in order to control the function or operation of the electronic device 10.

The memory element 18 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, solid state memory, or the like, or combinations thereof. In some embodiments, the memory element 18 may be embedded in, or packaged in the same package as, the processing element 20. The memory element 18 may include, or may constitute, a non-transitory "computer-readable medium". The memory element 18 may store the instructions, code, code statements, code segments, software, firmware, programs, applications, apps, services, daemons, or the like that are executed by the processing element 20. The memory element 18 is in communication electronic with the processing element 20 and may also store data that is received by the processing element 20 or the device in which the processing element 20 is implemented. The processing element 20 may further store data or intermediate results generated during processing, calculations, and/or computations as well as data or final results after processing, calculations, and/or computations. In addition, the memory element 18 may store settings, text data, documents from word processing software, spreadsheet software and other software applications, sampled audio sound files, photograph or other image data, movie data, databases, and the like.

The processing element 20 may comprise one or more processors. The processing element 20 may include electronic hardware components such as microprocessors (single-core or multi-core), microcontrollers, digital signal processors (DSPs), field-programmable gate arrays (FPGAs), analog and/or digital application-specific integrated circuits (ASICs), intelligence circuitry, or the like, or combinations thereof. The processing element 20 may generally execute, process, or run instructions, code, code segments, code statements, software, firmware, programs, applications, apps, processes, services, daemons, or the like. The processing element 20 may also include hardware components such as registers, finite-state machines, sequential and combinational logic, configurable logic blocks, and other electronic circuits that can perform the functions necessary for the operation of the current invention. In certain embodiments, the processing element 20 may include multiple computational components and functional blocks that are packaged separately but function as a single unit. In some embodiments, the processing element 20 may further include multiprocessor architectures, parallel processor architectures, processor clusters, and the like, which provide high performance computing. The processing element 20 may be in communication electronic with the other electronic components of the electronic device 10 through serial or parallel links that include universal busses, address busses, data busses, control lines, and the like. In addition, the processing element 20 may include ADCs to convert analog electronic signals to (streams of) digital data values and/or digital to analog converters (DACs) to convert (streams of) digital data values to analog electronic signals.

The processing element 20 may be operable, configured, and/or programmed to perform the functions, operations, processes, methods, and/or algorithms of the electronic device 10 by utilizing hardware, software, firmware, or combinations thereof. Other components, such as the communication element 24 and the memory element 18 may be utilized as well.

The location determining element 22 generally determines a current geolocation of the electronic device 10 and may receive and process radio frequency (RF) wireless signals, such as wireless location signals, output by satellites of a multi-constellation GNSS such as the global positioning system (GPS) utilized in the United States, the GLONASS system utilized in Russia, the Galileo system utilized in Europe, or the like. The location determining element 22 may include satellite navigation receivers, processors, controllers, other computing devices, or combinations thereof, and memory. The location determining element 22 receives and processes a first location electronic signal from the first GNSS antenna 44 and a second location electronic signal from the second GNSS antenna 46 via printed circuit board connectors 42. The first location electronic signal includes data and information that the location determining element 22 is able to utilize to determine a current geolocation of the electronic device 10. The first location electronic signal is output by GPS satellites and has a frequency in the GPS L1 band, which has a center frequency of approximately 1575 MHz. The second location electronic signal includes data and information that the location determining element 22 is able to utilize to determine a current geolocation of the electronic device 10. The second location electronic signal is output by GPS satellites and has a frequency in the GPS L5 band, which has a center frequency of approximately 1175 MHz. The location determine element 22 can receive and utilize location signals output by GPS satellites in the GPS L1 band and/or GPS L5 band. With the data and information from location signals output by GOS satellites on both the GPS L1 band and the GPS L5 band, the location determining element 22 of the current technology is capable of determining the current geolocation of the electronic device 10 with greater accuracy than conventional devices that may only utilize location signals output by GPS satellites on the GPS L1 band alone. The location determining element 22 may communicate the determined current geolocation to the processing element 20, store the determined current geolocation in the memory element 18, or both. Although the location determining element 22 of the current technology utilizes data and information from location signals output on both GPS L1 and L5 bands, it is within the scope of the current technology for the location determining element 22 to utilize data and information from two or more bands from other GNSS constellations, such as GLONASS or Galileo. The location determining element 22 is mounted on the printed circuit board 28 and electrically coupled with the printed circuit board connectors 42.

Figure 11:
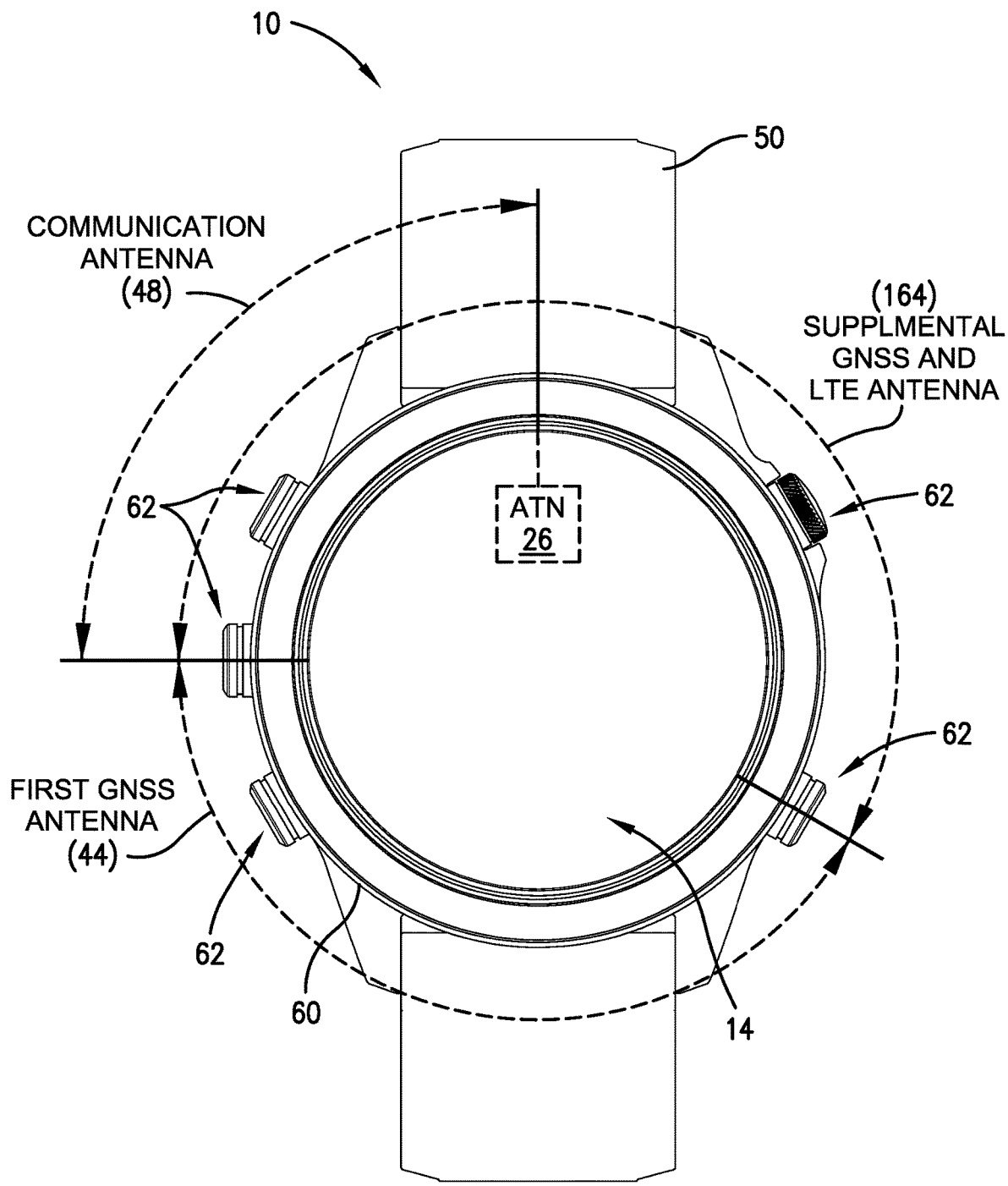
FIG. 11 is a top plan view of the second embodiment of the electronic device.

The communication element 24 processes a communication electronic signal that allows the electronic device 10 to communicate with other electronic devices, external systems, networks, such as a Bluetooth™ network and/or a long-term evolution (LTE) cellular network, as shown in FIG. 11, and the like. The communication element 24 may include signal and/or data transmitting and receiving circuits, such as amplifiers, filters, mixers, oscillators, DSPs, and the like that process RF electronic signals which include data transmitted and received using various communication standards. The communication element 24 processes the communication electronic signal with a frequency component ranging from approximately 2.40 gigahertz (GHz) to approximately 2.4835 GHz and includes data associated with communication standards such as ANT, ANT+, Bluetooth™, Bluetooth™ low energy (BLE), the industrial, scientific, and medical (ISM) band at 2.4 GHz, or the like. In addition, or instead, the communication electronic signal may include data that is associated with various Institute of Electrical and Electronics Engineers (IEEE) 802.11 Wi-Fi standards operating at 2.4 GHz. In other embodiments, the communication antenna 48 and communication element 24 may be utilized to process the communication electronic signal with a frequency component at approximately 860 MHz (MHz) to and includes data associated with communication standards utilized in cellular communications, such as LTE LTE (low band LTE commonly uses frequencies ranging from approximately 600 MHz to approximately 900 MHz). The communication element 24 may decode data that has been received in the communication electronic signal for one or more communication protocols and encode data in the communication electronic signal to be transmitted for one or more communication protocols. The communication electronic signal is communicated between the communication element 24 and the communication antenna 48 via the printed circuit board connectors 42. The communication element 24 is mounted on the printed circuit board 28 and electrically coupled with the printed circuit board connectors 42.

Figure 4:
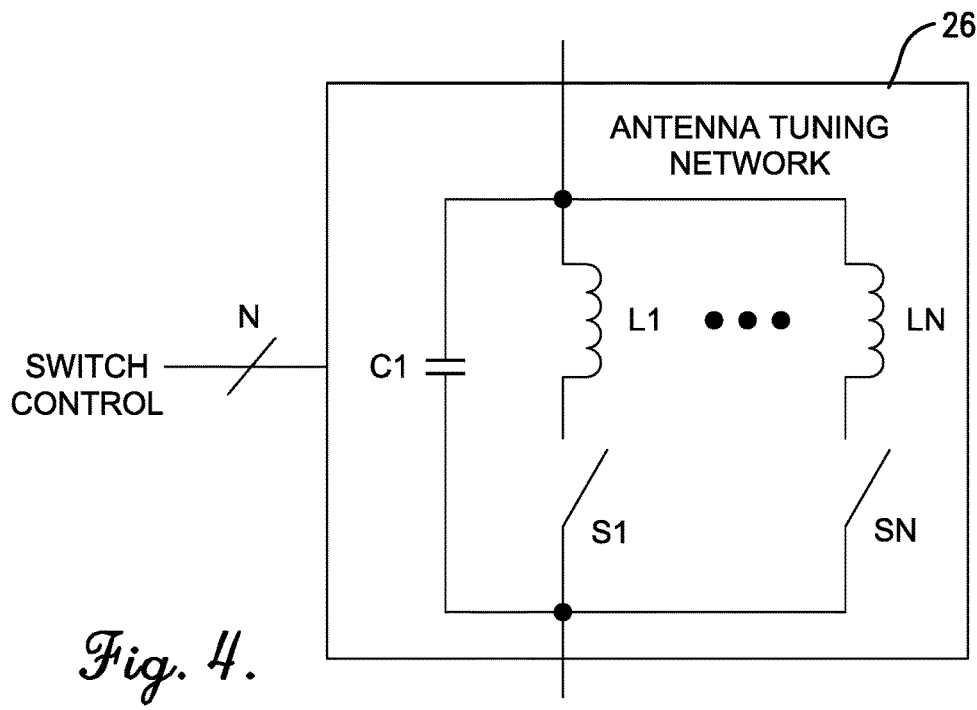
FIG. 4 is a schematic block diagram of an antenna tuning network that is utilized with a communication antenna.

The antenna tuning network 26 may include impedance, reactive, and/or resistive passive components as well as L networks, T networks, Pi networks, combinations thereof and so forth. Referring to FIG. 4, exemplary embodiments of the antenna tuning network 26 provide an adjustable configuration of components that includes a fixed value or variable value capacitor (C1) in parallel with a plurality of inductor (L1-LN) and SPST switch (S1-SN) series combinations. Each S1-SN switch functions, exists, or operates in either an open state or a closed state, and the state of each switch S1-SN is individually controlled, set, or determined by one of a plurality of switch control electronic signals received from the processing element 20. The switches operating in the closed or opened state in various combinations adjusts the reactance and/or impedance of the antenna tuning network 26. The antenna tuning network 26 receives the communication electronic signal from the communication antenna 48 and passes only frequency components of the communication electronic signal within a selected band of frequencies and filtering the other frequency components, thereby effectively tuning the communication antenna 48. The antenna tuning network 26 outputs or communicates a tuned communication electronic signal to the communication element 24. The antenna tuning network 26 is mounted on the printed circuit board 28 and electrically coupled with the printed circuit board connectors 42. In embodiments, the antenna tuning network is configured (by selection of appropriate impedance, reactive, and/or resistive passive components as well as L networks, T networks, Pi networks, or combinations thereof) to cause wireless signals having a certain frequency to be electrically grounded at the location of a bezel connector electrically coupled with the antenna tuning network 26, such as the sixth bezel connector 40 that contacts a lower surface of the bezel 60 at approximately 12:00 and electrically grounding signals having a frequency of approximately 2.4 GHz, and an open circuit for signals having a different frequency.

The printed circuit board 28 retains a plurality of the components of the electronic device 10 and provides electrical connection and electronic communication therebetween. The printed circuit board 28 may be of generally known construction with a first side and an opposing second side. The printed circuit board 28 may also include multiple electrically conductive layers with a top conductive layer placed on the first side, a bottom conductive layer placed on the second side, one or more inner conductive layers positioned between the first and second sides, and an insulating layer between each pair of adjacent conductive layers. The insulating layers may be formed from rigidized or flexible material that includes various combinations of fiberglass, woven glass, matte glass, cotton paper, phenolic cotton paper, polyester, other polymers, epoxies, epoxy resins, and the like. Each electrically conductive layer may include one or more electrically conductive features, such as electronic signal traces, electric power or ground traces, one or more signal, power, or ground pads, integrated circuit package footprints, full or partial power planes, or full or partial ground planes. Also, the electrically conductive features include passive electrical circuit components, such as resistors, capacitors, and inductors. The conductive layers may be formed from metals typically including copper, but also including nickel, aluminum, gold, silver, palladium, zinc, tin, lead, and the like. In addition, the printed circuit board 28 may include plated through hole vias, blind vias, buried vias, and the like. Furthermore, the printed circuit board 28 may include one or more partial or full signal planes and/or one or more signal traces which provide electrical connection, or a signal return path, from the lower housing 12A to the location determining element 22 and the antenna tuning network 26.

Each of the bezel connectors 30, 32, 34, 36, 38, 40 are formed from electrically conductive material, such as metals and/or metal alloys. Although the bezel connectors 30, 32, 34, 36, 38, 40 may be embodied by a variety of connector configurations or packages, exemplary embodiments of the bezel connectors 30, 32, 34, 36, 38, 40 are pogo pins. In such embodiments, each bezel connector 30, 32, 34, 36, 38, 40 may include an outer cylinder and an inner cylinder positioned within the outer cylinder, wherein the inner cylinder retracts into and extends from the outer cylinder. Referring to FIG. 2, the first bezel connector 30, the second bezel connector 32, and the third bezel connector 34 each electrically connect the side wall 54 of the lower housing 12A to the bezel 60 and pass through openings in the housing insulating ring 58. The first bezel connector 30 is positioned at a first point along the circumference of the bezel 60 and the side wall 54. The second bezel connector 32 is positioned at a second point along the circumference of the bezel 60 and the side wall 54. The third bezel connector 34 is positioned at a third point along the circumference of the bezel 60 and the side wall 54. The fourth bezel connector 36, the fifth bezel connector 38, and the sixth bezel connector 40 each electrically couple (connect) one or more traces of the printed circuit board 28 to a point on a lower surface of the bezel 60. The fourth bezel connector 36 is positioned in at a fourth point along the circumference of the bezel 60 and the side wall 54. The fifth bezel connector 38 is positioned at a fifth point along the circumference of the bezel 60 and the side wall 54. The sixth bezel connector 40 is positioned at with a sixth point along the circumference of the bezel 60 and the side wall 54.

Figure 5:
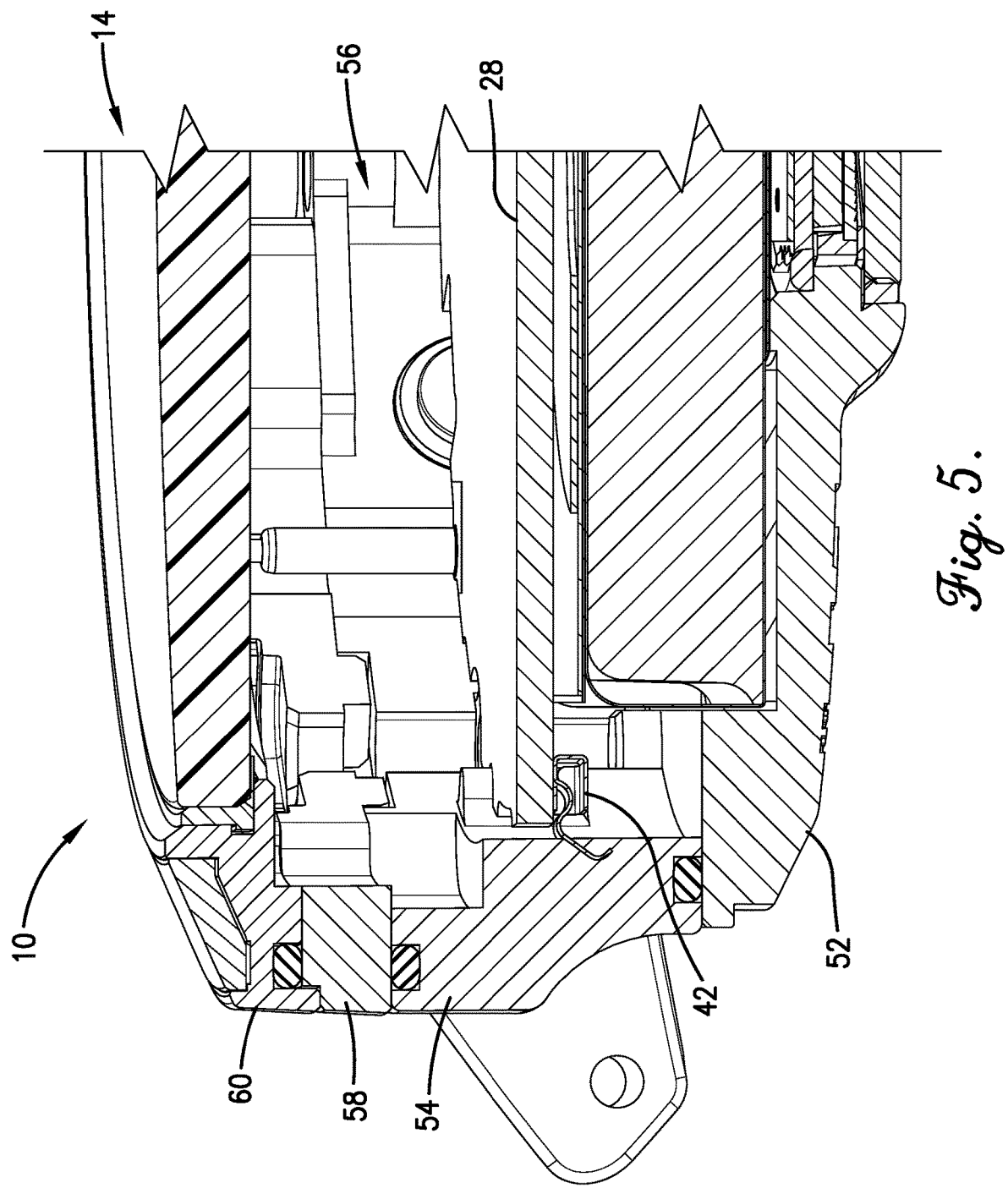
FIG. 5 is a partial sectional view of the electronic device cut along a vertical plane.

Each printed circuit board connector 42 is formed from electrically conductive material, such as metals and/or metal alloys. The printed circuit board connectors 42 electrically couple or provide electrical connection from a location proximate to the inner surface of side wall 54 of the lower housing 12A to one or more partial or full signal planes and/or one or more signal traces of the printed circuit board 28. Referring to FIG. 5, one of the printed circuit board connectors 42 is shown. Although the printed circuit board connectors 42 may be embodied by a variety of connector configurations or packages, exemplary embodiments of the printed circuit board connector 42 include a lower conductor, three side walls, an upper conductor which contacts the printed circuit board 28 (and electrically couples or electrically connects to planes or traces thereof), and an arm extending outward from the upper conductor and electrically connecting to the side wall 54. Exemplary embodiments of the electronic device 10 include five (5) printed circuit board connectors 42 distributed along the circumference of the side wall 54.

Figure 6:
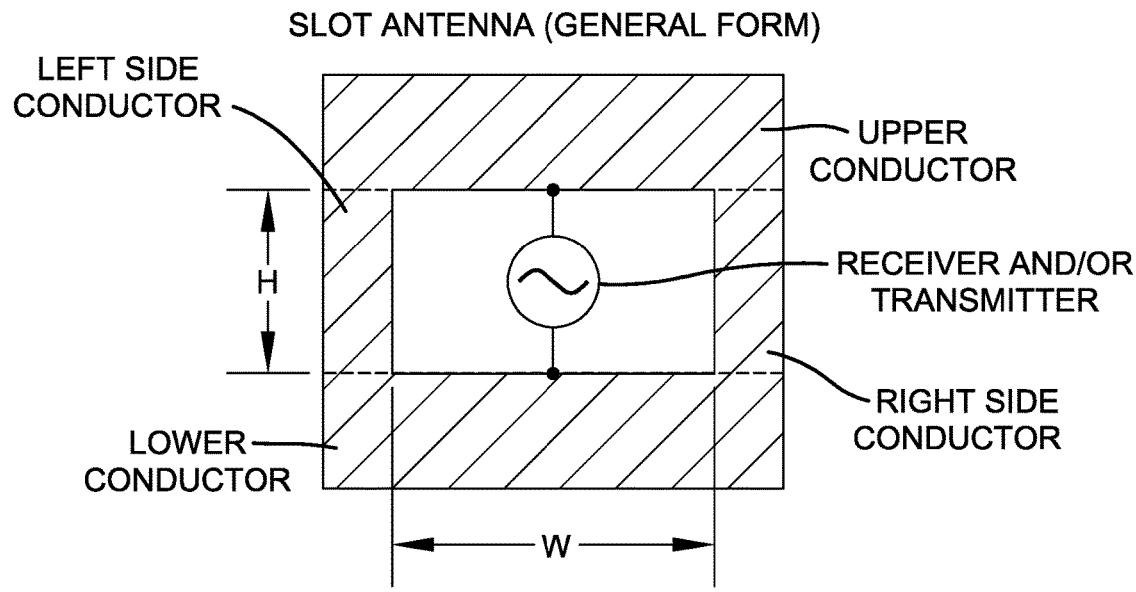
FIG. 6 is a schematic diagram of a general form of a slot antenna.

Each of the antennas 44, 46, 48 converts wireless RF electromagnetic radiation (a wireless signal) at a particular frequency, i.e., a resonant frequency, into a corresponding electronic signal and converts an electronic signal into a corresponding wireless signal. Each antenna 44, 46, 48 may be implemented as a loop antenna, a microstrip antenna, a patch antenna, a linear antenna, an inverted F-antenna, an inverted L-antenna, a dipole antenna, or the like. However, an exemplary embodiment of each antenna 44, 46, 48 is implemented as a slot antenna. Referring to FIG. 6, the slot antenna, in its general form, includes an open-centered quadrilateral structure formed from electrically conductive material, such as metals or metal alloys. The slot antenna structure includes an upper conductor, a lower conductor, a left side conductor, and a right side conductor connected to one another to form or create a slot. Each slot has a height, labeled "H", and a width, labeled "W". Typically, for a wrist-worn device, the width of each slot is greater than the height of that slot. A signal feed electrically coupled with an electronic receiver and/or transmitter is electrically coupled with a lower edge of the upper conductor (an upper edge of the slot). When the slot antenna receives a wireless signal, a corresponding electronic signal is electrically communicated from the signal feed point to the receiver via printed circuit board connectors 42. When the transmitter electrically communicates an electronic signal to the slot antenna, the slot antenna wirelessly transmits the corresponding signal. The width of the slot corresponds to a whole or fractional (such as a half or a quarter) wavelength of the wireless signal that is to be received and/or transmitted.

Generally speaking, each slot antenna of the electronic device 10, as discussed in more detail below, utilizes a portion of the bezel 60 as the upper conductor and a portion of the side wall as the lower conductor, with two bezel connectors 30, 32, 34, 36, 38, or 40 forming its side conductors. The upper conductor and the lower conductor of each slot antenna is separated by the housing insulating ring 58, which provides an electrically insulating space between the upper surface of side wall 54 and the lower surface of bezel 60.

Figure 7A:
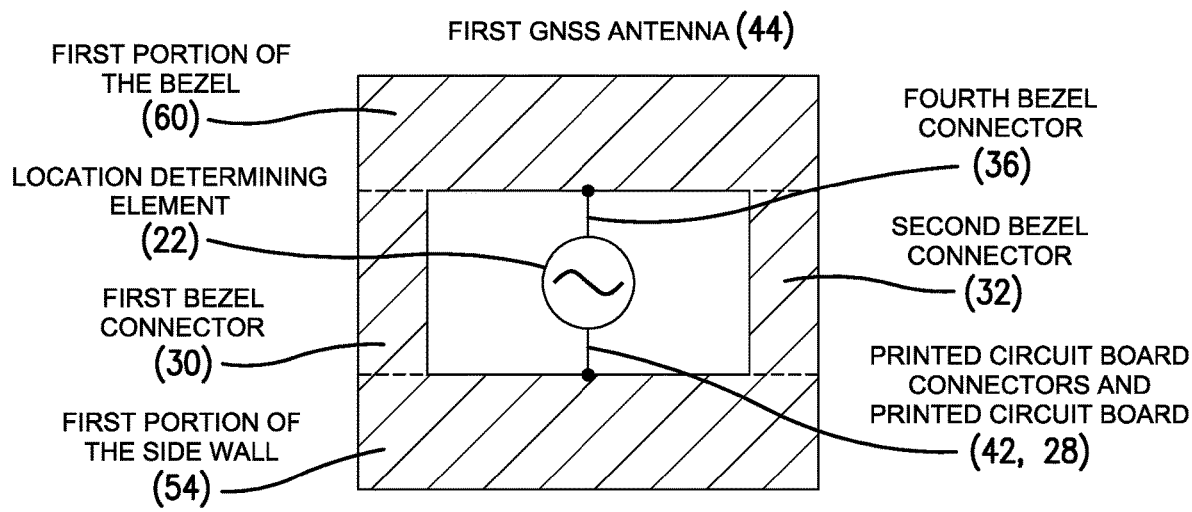
FIG. 7A is a schematic diagram of the slot antenna components of a first GNSS antenna.
Figure 7B:
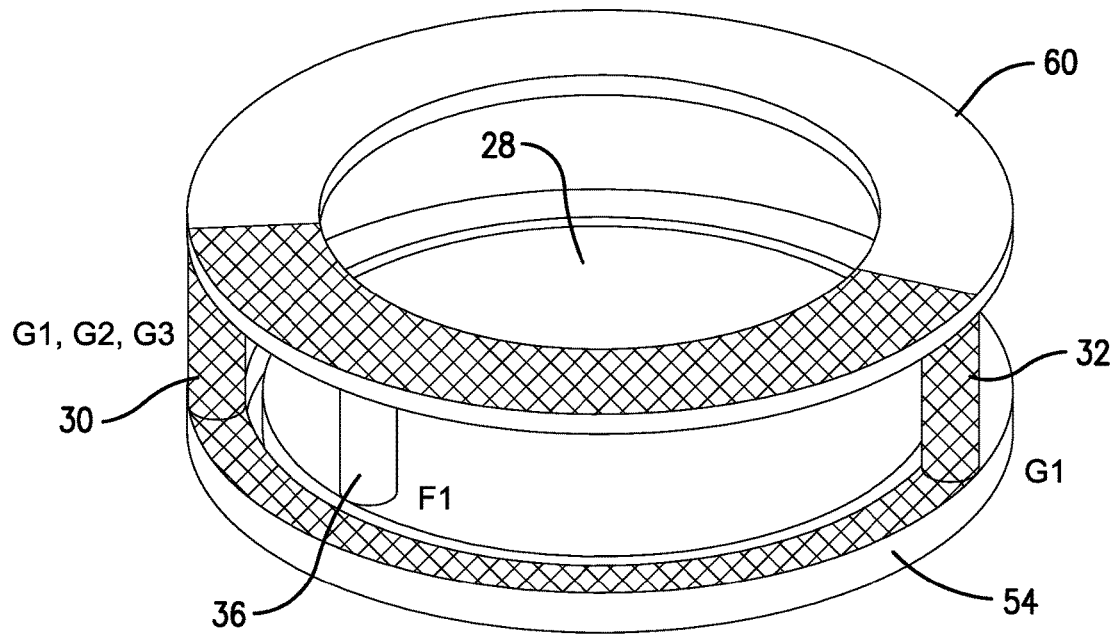
FIG. 7B is a simplified theoretical schematic representation of the portions of the bezel and a side wall of the lower housing which form parts of the first GNSS antenna.

Referring to FIGS. 7A and 7B, the slot antenna structural components of the first GNSS antenna 44 are formed by the following components of the electronic device 10. The upper conductor of the first GNSS antenna 44 is formed by a first portion of the circumference of the bezel 60, as indicated in FIGS. 1 and 7B, extending in a clockwise (CW) direction from approximately 4:00 to 9:00. The left side conductor of the first GNSS antenna 44 is formed by the first bezel connector 30, which is labeled in FIG. 7B as "G1, G2, G3", as it serves as an electrical ground or common electronic signal path for the first GNSS antenna 44, the second GNSS antenna 46, and the communication antenna 48. The right side conductor of the first GNSS antenna 44 is formed by the second bezel connector 32, which is labeled in FIG. 7B as "G1", as it serves as an electrical ground or common electronic signal path for the first GNSS antenna 44 only for this embodiment. The lower conductor of the first GNSS antenna 44 is formed by a first portion of the circumference of the side wall 54 of the lower housing 12A, as is shown in FIG. 7B, which is positioned in alignment with the first portion of the circumference of the bezel 60, extending in a clockwise direction from approximately 4:00 to 9:00. The first GNSS antenna 44 is electrically coupled with the location determining element 22 through the fourth bezel connector 36, which is labeled in FIG. 7B as "F1" (as it serves as a feed point for the first GNSS antenna 44), one of the printed circuit board connectors 42 and signal traces of the printed circuit board 28.

Figure 8A:
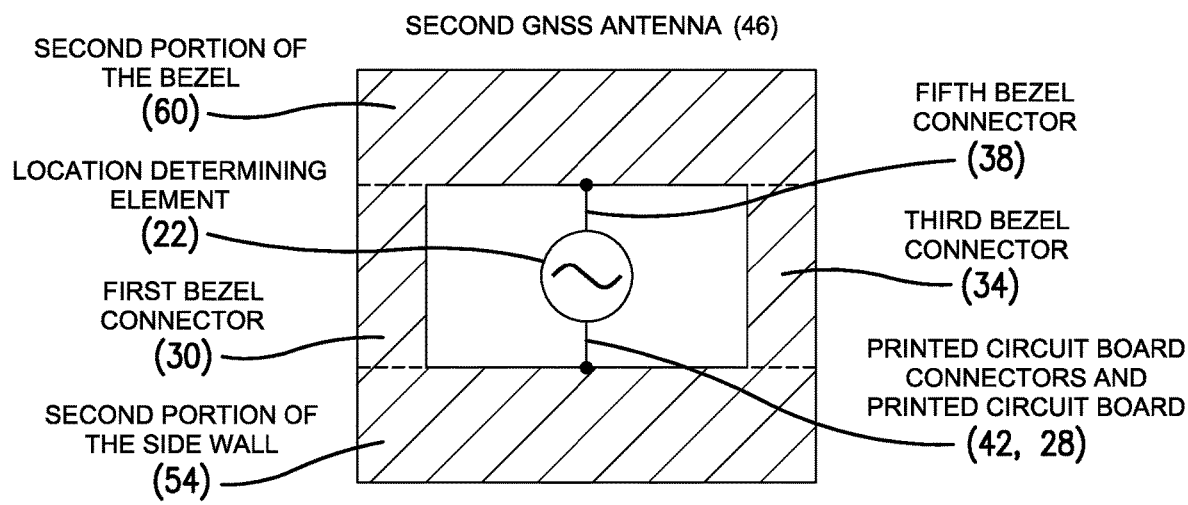
FIG. 8A is a schematic diagram of the slot antenna components of a second GNSS antenna.
Figure 8B:
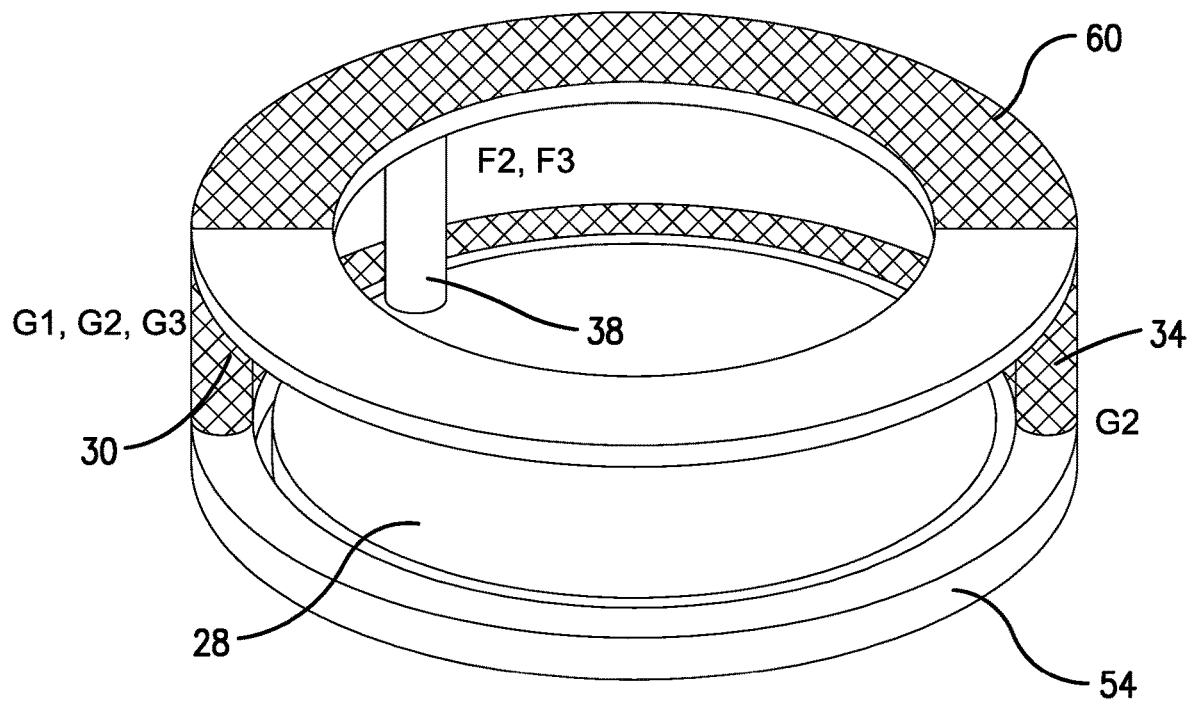
FIG. 8B is a simplified theoretical schematic representation of the portions of the bezel and the side wall of the lower housing that form parts of the second GNSS antenna.

Referring to FIGS. 8A and 8B, the slot antenna structural components of the second GNSS antenna 46 are formed by the following components of the electronic device 10. Similar to the first GNSS antenna 44, the upper conductor of the second GNSS antenna 46 is formed by a second portion of the circumference of the bezel 60, as indicated in FIGS. 1 and 8B, extending in a clockwise (CW) direction from approximately 9:00 to 3:00. The left side conductor of the second GNSS antenna 46 is formed by the first bezel connector 30. The right side conductor of the second GNSS antenna 46 is formed by the third bezel connector 34, which is labeled in FIG. 8B as "G2", as it serves as an electrical ground or common electronic signal path for the second GNSS antenna 46 only for this embodiment. The lower conductor of the second GNSS antenna 46 is formed by a second portion of the circumference of the side wall 54 of the lower housing 12A, as is shown in FIG. 8B, which is positioned in alignment with the second portion of the circumference of the bezel 60, extending in a clockwise direction from approximately 9:00 to 3:00. The second GNSS antenna 46 is electrically coupled with the location determining element 22 through the fifth bezel connector 38, which is labeled in FIG. 8B as "F2, F3" (as it serves as a feed point for the second GNSS antenna 46 and the communication antenna 48), one of the printed circuit board connectors 42 and signal traces of the printed circuit board 28.

Figure 9A:
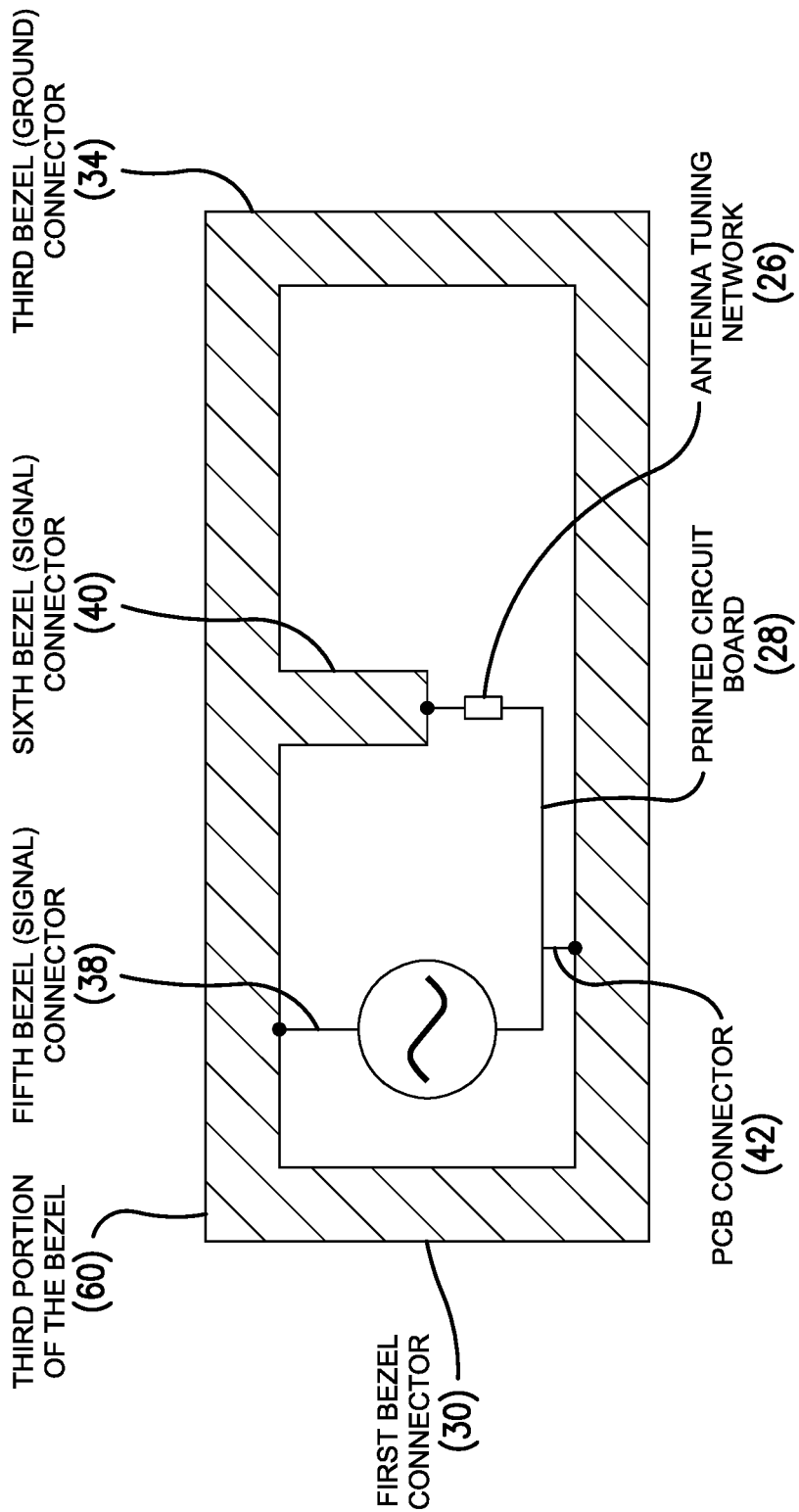
FIG. 9A is a schematic diagram of the slot antenna components of the communication antenna and the second GNSS antenna.
Figure 9B:
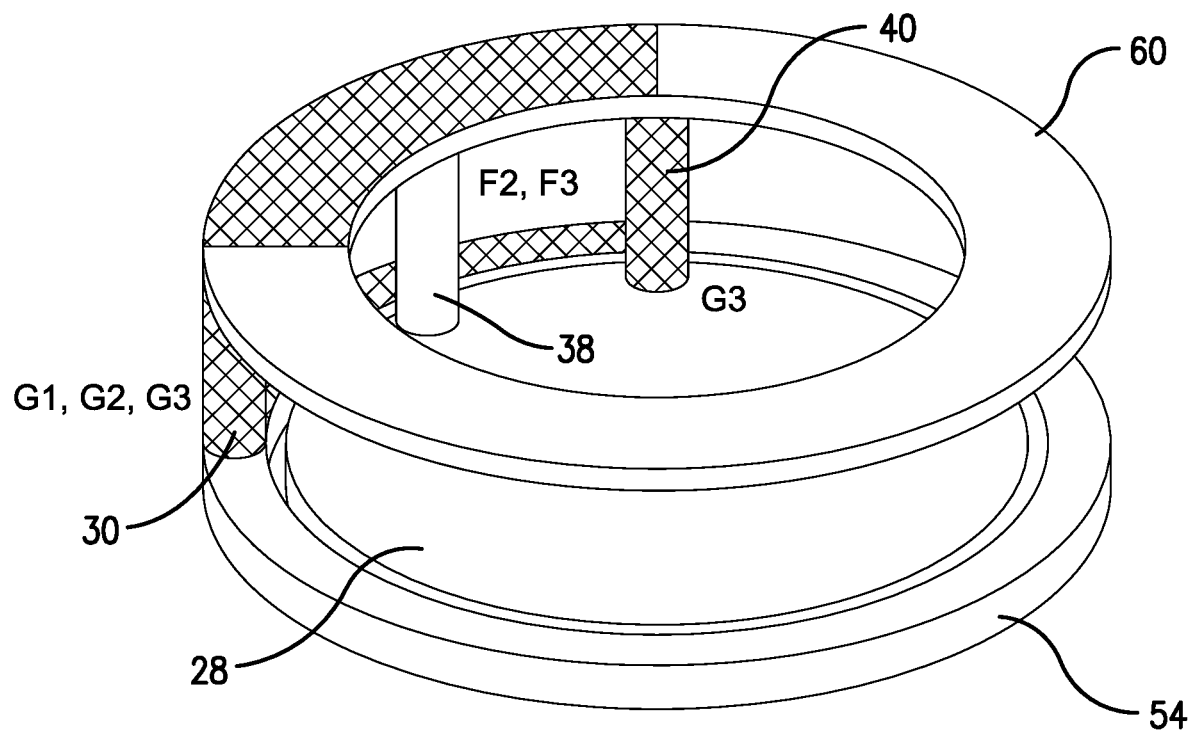
FIG. 9B is a simplified theoretical schematic representation of the portions of the bezel and the side wall of the lower housing which form parts of the communication antenna.

Referring to FIGS. 9A and 9B, the slot antenna structural components of the communication antenna 48 are formed by the following components of the electronic device 10. Similar to the first GNSS antenna 44 and the second GNSS antenna 46, the upper conductor of the communication antenna 48 is formed by a third portion of the circumference of the bezel 60, as indicated in FIGS. 1 and 9B, extending in a clockwise (CW) direction from approximately 9:00 to 12:00. The third portion of the circumference of the bezel 60 associated with the communication antenna 48 partially overlaps with the second portion of the circumference of bezel 60 associated with the second GNSS antenna 46, wherein a first end of the third portion of the circumference of bezel 60 is collocated with a first end of the second portion of the circumference of bezel 60. The left side conductor of the communication antenna 48 is formed by the first bezel connector 30. The right side conductor of the communication antenna 48 is formed by the sixth bezel connector 40, which is labeled in FIG. 9B as "G3", as it serves as an electrical ground or common electronic signal path for the communication antenna 48 only in this embodiment. As shown in FIG. 9B, a second end of the third portion of the circumference of bezel 60 formed by sixth bezel connector 40 is positioned closer (when measuring along the circumference of bezel 60 in a clockwise direction) to the collocated first end of the second and third portions of the circumference (located at approximately 9:00) than the second end of the second portion of the circumference of bezel 60 formed by sixth bezel connector 40 (as the sixth bezel connector 40 associated with the second end of the third portion is located at approximately 12:00 and the third bezel connector 34 associated with the second end of the second portion is located at approximately 3:00). The lower conductor of the communication antenna 48 is formed by a third portion of the circumference of the side wall 54 of the lower housing 12A, as is shown in FIG. 9B. The third portion of the circumference of the side wall 54 is positioned in alignment with the third portion of the circumference of the bezel 60, extending in a clockwise direction from approximately 9:00 to 12:00. Thus, the third portion of the circumference of the side wall 54 associated with the communication antenna 48 partially overlaps with the second portion of the circumference associated with the second GNSS antenna 46 the circumference is positioned within a second end of the second portion of the circumference. The communication antenna 48 is electrically coupled with the communication element 24 through the fifth bezel connector 38, which is labeled in FIG. 9B as "F2, F3" (as it serves as a feed point for the second GNSS antenna 46 and the communication antenna 48), one of the printed circuit board connectors 42 and signal traces of printed circuit board 28. The second end of the third portion of the bezel 60 is electrically coupled or electrically connected to an antenna tuning network 26 on the printed circuit board 28. The antenna tuning network 26 is configured to cause signals having one or more frequencies to be received using communication antenna 48 to pass through the sixth bezel connector 40. The communication antenna 48 is electrically coupled with the sixth bezel connector 40 and configured to cause frequency components of the communication electronic signal within a selected band of frequencies to pass from the bezel 60 through the sixth bezel connector 40 resulting in a signal path associated with the communication antenna 48 that is shorter in length than a signal path associated with the second GNSS antenna 46. The communication antenna 48 is electrically coupled with the communication element 24 (including the receiver and the transmitter thereof) through the fifth bezel connector 38, which is labeled in FIG. 9B as "F2, F3" (as it serves as a feed point for the second GNSS antenna 46 and the communication antenna 48), one of the printed circuit board connectors 42 and signal traces of.

In the embodiment of the electronic device 10 shown in FIG. 1, the upper conductor of the first GNSS antenna 44, the second GNSS antenna 46, and the communication antenna 48 each occupy portions, some partially overlapping, of the circumference of the bezel 60 as shown. The remaining portion of the circumference of the bezel 60 not associated with an antenna may be electrically connected to electric ground.

The first GNSS antenna 44 and the second GNSS antenna 46 may each be configured to receive any one of the GNSS constellation wireless signals. However, in exemplary embodiments, the first GNSS antenna 44 is configured to receive the GPS L1 band wireless signal which has a center frequency of approximately 1575 MHz and, in turn, output or convey the first location electronic signal to the location determining element 22 via printed circuit board connectors 42. The second GNSS antenna 46 is configured to receive the GPS L5 band wireless signal which has a center frequency of approximately 1175 MHz and, in turn, output or convey the second location electronic signal to the location determining element 22.

The communication antenna 48 receives or transmits the communication wireless signal, such as Bluetooth™ or Wi-Fi, which has a center frequency of approximately 2.4 GHz. The communication antenna 48, in turn, outputs or conveys the communication electronic signal to or from the communication element 24, as necessary. Accordingly, when the electronic device 10 needs to send data over LTE, Bluetooth™ or Wi-Fi, the communication element 24 outputs the communication electronic signal (which includes the data) to the communication antenna 48, which, in turn, transmits the communication wireless signal.

Figure 10:
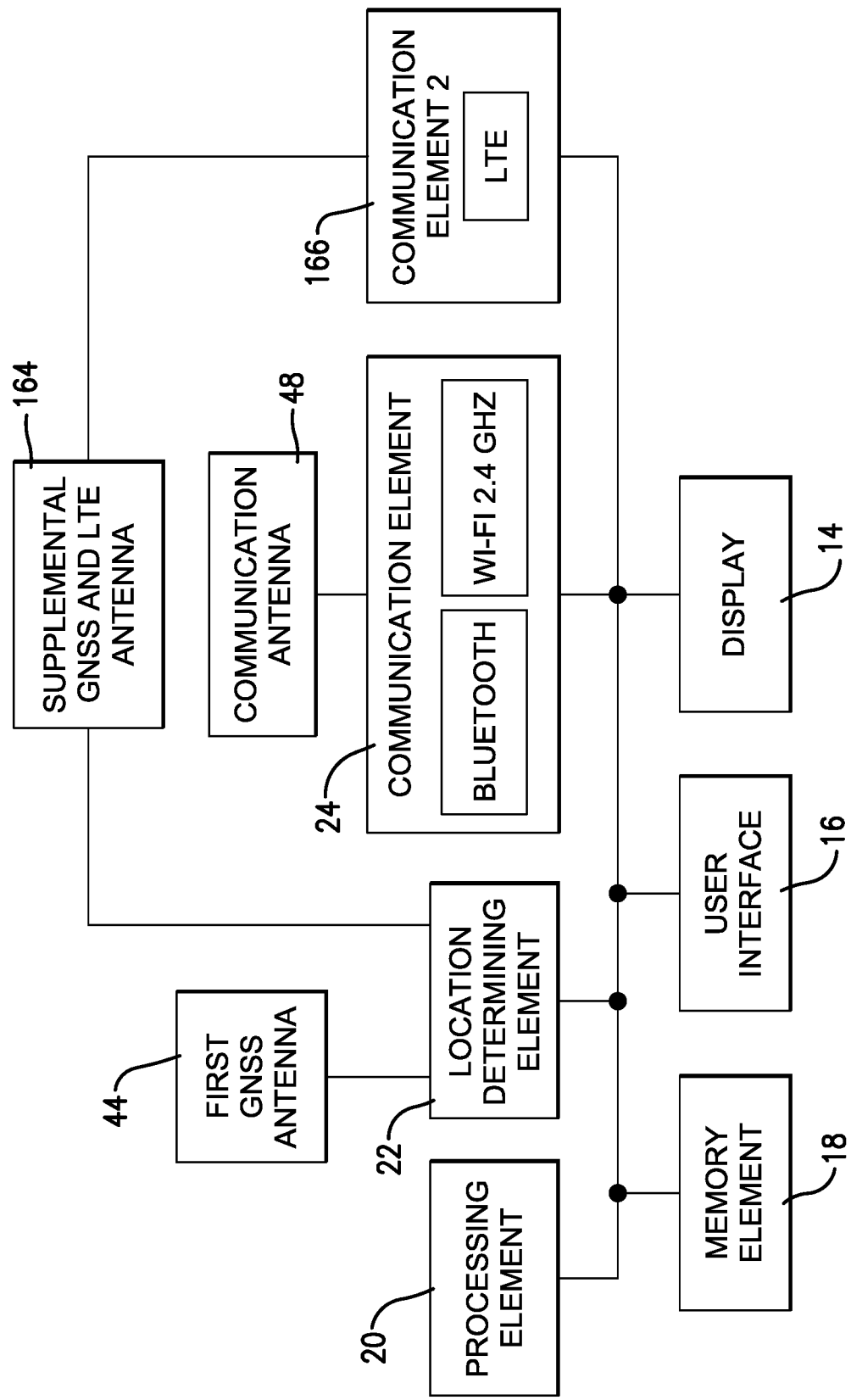
FIG. 10 is a schematic block diagram of various electronic components of a second embodiment of the electronic device.

Referring to FIGS. 10 and 11, another embodiment of the wrist-worn electronic device 100 is illustrated. The electronic device 100 comprises all of the components of the electronic device 10 except that the second GNSS antenna 46 is combined with a long-term evolution (LTE) antenna to form a supplemental GNSS and LTE antenna 164. The electronic device 100 also includes a second communication element 166. The electronic device 100 may be utilized to provide cellular access to telecommunication, such as voice calls, and other communication, such as text messages and Internet access, when Bluetooth™ and Wi-Fi are not available.

The second communication element 166 processes a second communication electronic signal that allows the electronic device 10 to communicate with cellular (telecom) systems, networks, routers, switches, and the like. The second communication element 166 includes components similar to those of the (first) communication element 24 that allow the second communication element 166 to process the second communication electronic signal having an operating frequency ranging from approximately 600 MHz to approximately 900 MHz—including low band LTE or similar telecommunication protocols. The second communication element 166 may decode data that has been received in the second communication electronic signal and encode data in the second communication electronic signal to be transmitted. The second communication electronic signal is communicated between the second communication element 166 and the supplemental GNSS and LTE antenna 164.

In various embodiments, the components and the functionality of the second communication element 166 may be included in the (first) communication element 24, and thus, the second communication electronic signal may be communicated between the (first) communication element 24 and the supplemental GNSS and LTE antenna 164.

The supplemental GNSS and LTE antenna 164 is typically implemented as a slot antenna, although other implementations are possible. Given that the range of operating frequencies for the L5 GPS band and the low band of LTE are not too far from one another, the width of the slot of the second GNSS antenna may be extended by a small amount to form the supplemental GNSS and LTE antenna 164 so that the supplemental GNSS and LTE antenna 164 is operational in both the L5 GPS band and the low band of LTE.

Figure 12A:
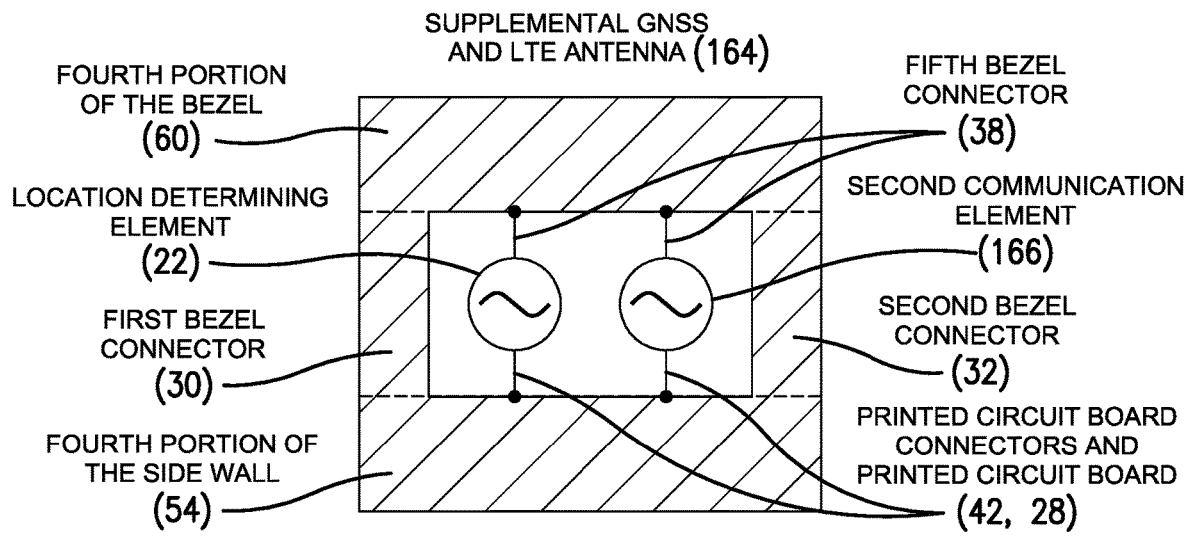
FIG. 12A is a schematic diagram of the slot antenna components of a supplemental GNSS and LTE antenna.
Figure 12B:
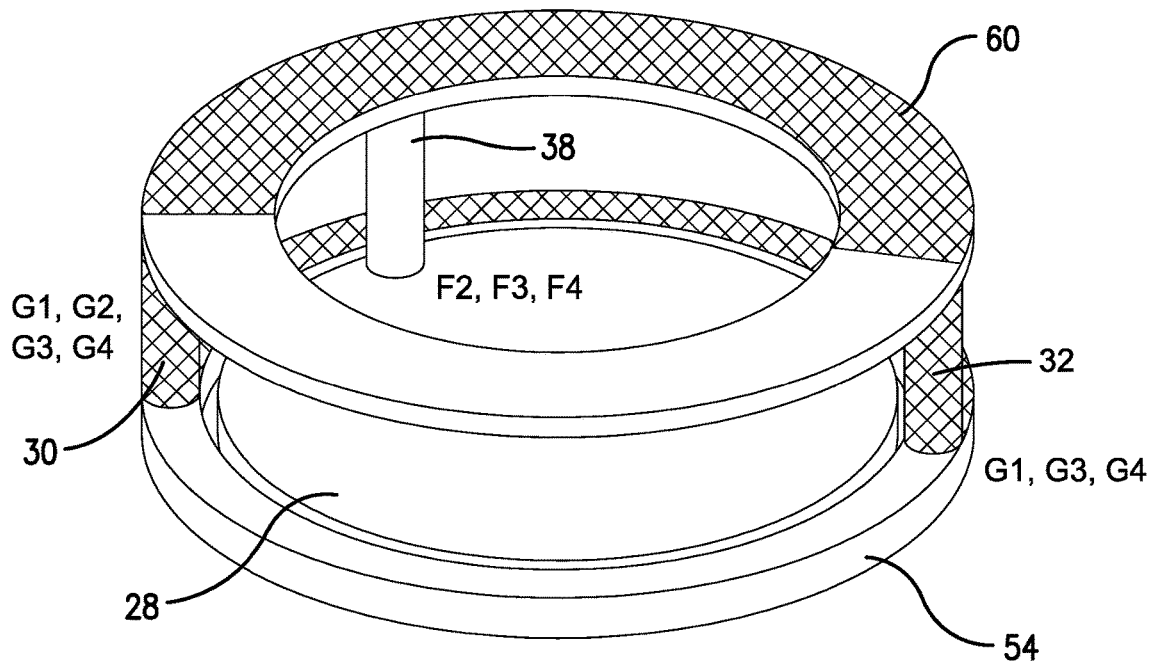
FIG. 12B is a simplified theoretical schematic representation of the portions of the bezel and the side wall of the lower housing which form parts of the supplemental GNSS and LTE antenna.

Referring to FIGS. 12A and 12B, the slot antenna structural components of the supplemental GNSS and LTE antenna 164 are formed by the following components of the electronic device 100. The upper conductor of the supplemental GNSS and LTE antenna 164 is formed by a fourth portion of the circumference of the bezel 60, as indicated in FIGS. 11 and 12B, extending in a clockwise (CW) direction from approximately 9:00 to approximately 4:00. The left side conductor of the supplemental GNSS and LTE antenna 164 is formed by the first bezel connector 30, which is labeled in FIG. 12B as "G1, G2, G3, G4", as it serves as an electrical ground or common electronic signal path for the first GNSS antenna 44, the communication antenna 48, and the supplemental GNSS and LTE antenna 164. The right side conductor of the supplemental GNSS and LTE antenna 164 is formed by the second bezel connector 32, which is labeled in FIG. 12B as "G1, G3, G4", as it serves as an electrical ground or common electronic signal path for the first GNSS antenna 44 and the supplemental GNSS and LTE antenna 164. The lower conductor of the supplemental GNSS and LTE antenna 164 is formed by a fourth portion of the circumference of the side wall 54 of the lower housing 12A, as is shown in FIG. 12B, which is positioned in alignment with the fourth portion of the circumference of the bezel 60, extending in a clockwise (CW) direction from approximately 9:00 to approximately 4:00. The supplemental GNSS and LTE antenna 164 is electrically coupled with both the location determining element 22 and the second communication element 166 through the fifth bezel connector 38, which is labeled in FIG. 12B as "F2, F3, F4" (as it serves as a feed point for the communication antenna 48 and the supplemental GNSS and LTE antenna 164), one of the printed circuit board connectors 42 and signal traces of the printed circuit board 28.

The supplemental GNSS and LTE antenna 164 is configured to receive the GPS L5 band wireless signal which has a center frequency of approximately 1175 MHz and, in turn, output or convey the second location electronic signal to the location determining element 22. The supplemental GNSS and LTE antenna 164 is also configured to receive a second communication wireless signal in the low band of LTE, which has a frequency ranging from approximately 600 MHz to approximately 900 MHz. The supplemental GNSS and LTE antenna 164, in turn, outputs or conveys the second communication electronic signal to the second communication element 166. When the electronic device 100 needs to send data over a cellular LTE network, the supplemental GNSS and LTE antenna 164 outputs the second communication electronic signal (which includes the data) to the supplemental GNSS and LTE antenna 164, which, in turn, wirelessly transmits the communication signal.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A wrist-worn electronic device comprising:
a lower housing including a lower surface and a side wall formed of electrically conductive material, the side wall having a top surface;
an upper housing opposing the lower housing, the upper housing including a bezel formed of an electrically conductive material, the bezel having a lower surface corresponding to the top surface of the side wall;

a plurality of bezel connectors, each bezel connector providing an electrical connection to the bezel;

a first global navigation satellite system (GNSS) antenna configured to receive a first GNSS wireless signal having a first frequency and to conduct a first location electronic signal having the first frequency, the first GNSS antenna formed by:
  a first portion of a circumference of the bezel,
  a first portion of a circumference of the side wall,
  a first bezel connector positioned at a first end of the first portion of the circumference of the bezel and a first end of the first portion of the circumference of the side wall, and
  a second bezel connector positioned at a second end of the first portion of the circumference of the bezel and a second end of the first portion of the circumference of the side wall;

a second GNSS antenna configured to receive a second GNSS wireless signal having a second frequency and to conduct a second location electronic signal having the second frequency, the second GNSS antenna formed by:
  a second portion of the circumference of the bezel having a first end and an opposing second end,
  a second portion of the circumference of the side wall having a first end and an opposing second end,
  the first bezel connector, and
  a third bezel connector positioned at the second end of the second portion of the circumference of the bezel and the second end of the second portion of the circumference of the side wall; and a communication antenna configured to transmit and receive a communication wireless signal having a third frequency and to conduct a communication electronic signal having the third frequency, the communication antenna formed by:
  a third portion of the circumference of the bezel partially overlapping with the second portion of the circumference of the bezel, the third portion of the circumference of the bezel having a first end and an opposing second end,
  a third portion of the circumference of the side wall partially overlapping with the second portion of the circumference of the side wall, the third portion of the circumference of the side wall having a first end and an opposing second end,
  the first bezel connector, and
  a fourth bezel connector positioned at the second end of the third portion of the circumference of the bezel and the second end of the third portion of the circumference of the side wall.

2. The wrist-worn electronic device of claim 1, further comprising a housing insulating ring positioned between the top surface of the side wall and the lower surface of the bezel, the housing insulating ring formed from electrically insulating material and configured to provide an electrically insulated space between the side wall and the bezel.

3. The wrist-worn electronic device of claim 2, wherein the first bezel connector, the second bezel connector, and the third bezel connector are each electrically connected to the side wall and the bezel through the housing insulating ring.

4. The wrist-worn electronic device of claim 1, further comprising a location determining element receiving the first location electronic signal and the second location electronic signal, the location determining element configured to determine a geolocation of the electronic device according to data in the first location electronic signal and the second location electronic signal.

5. The wrist-worn electronic device of claim 1, further comprising a communication element receiving the communication electronic signal, the communication element configured to decode data from, and encode data to, the communication electronic signal associated with one or more communication protocols.

6. The wrist-worn electronic device of claim 5, further comprising a printed circuit board and an antenna tuning network positioned on the printed circuit board, electrically coupled with the fourth bezel connector and configured to cause frequency components of the communication electronic signal within a selected band of frequencies to pass from the bezel through the fourth bezel connector resulting in a signal path associated with the communication antenna that is shorter in length than a signal path associated with the second GNSS antenna.

7. The wrist-worn electronic device of claim 1, further comprising a printed circuit board positioned above the lower surface of the lower housing and configured to retain a comprising location determining element receiving the first location electronic signal and the second location electronic signal and a communication element receiving the communication electronic signal.

8. The wrist-worn electronic device of claim 7, wherein the fourth bezel connector is electrically connected to the bezel and the printed circuit board.

9. The wrist-worn electronic device of claim 7, further comprising a fifth bezel connector electrically connecting the printed circuit board to the bezel within the first portion of the circumference, wherein the fifth bezel connector conducts a first location electronic signal.

10. The wrist-worn electronic device of claim 7, further comprising a sixth bezel connector electrically connecting the printed circuit board to the bezel within the third portion of the circumference, wherein the sixth bezel connector conducts a second location electronic signal and the communication electronic signal.

11. The wrist-worn electronic device of claim 7, further comprising a plurality of printed circuit board connectors electrically connecting conductors on the printed circuit board to the side wall.

12. The wrist-worn electronic device of claim 1, wherein the bezel has a fourth portion of the circumference positioned between the first portion and the second portion which is electrically connected to electrical ground.

13. The wrist-worn electronic device of claim 1, wherein the first portion of the circumference of the side wall is aligned with the first portion of the circumference of the bezel, the second portion of the circumference of the side wall is aligned with the second portion of the circumference of the bezel, and the third portion of the circumference of the side wall is aligned with the third portion of the circumference of the bezel.

14. The wrist-worn electronic device of claim 1, wherein the first end of the second portion of the circumference of the bezel is collocated with the first end of the first portion of the circumference of the bezel, the first end of the second portion of the circumference of the side wall is collocated with the first end of the first portion of the circumference of the side wall, the first end of the third portion of the circumference of the bezel is collocated with the first end of the first portion of the circumference of the bezel, and the first end of the third portion of the circumference of the side wall is collocated with the first end of the first portion of the circumference of the side wall.

15. A wrist-worn electronic device comprising:
a lower housing including a lower surface and a side wall formed of electrically conductive material, the side wall having a top surface;
an upper housing opposing the lower housing, the upper housing including a bezel formed of an electrically conductive material, the bezel having a lower surface corresponding to the top surface of the side wall;
a housing insulating ring positioned between the top surface of the side wall and the lower surface of the bezel, the housing insulating ring formed from electrically insulating material and configured to provide an electrically insulated space between the side wall and the bezel;
a plurality of bezel connectors, each bezel connector providing an electrical connection to the bezel;
a first global navigation satellite system (GNSS) antenna configured to receive a first GNSS wireless signal having a first frequency and to conduct a first location electronic signal having the first frequency, the first GNSS antenna formed by:
a first portion of a circumference of the bezel,
a first portion of a circumference of the side wall aligned with the first portion of the circumference of the bezel,
a first bezel connector positioned at a first end of the first portion of the circumference of the bezel and a first end of the first portion of the circumference of the side wall, and
a second bezel connector positioned at a second end of the first portion of the circumference of the bezel and a second end of the first portion of the circumference of the side wall;
a second GNSS antenna configured to receive a second GNSS wireless signal having a second frequency and to conduct a second location electronic signal having the second frequency, the second GNSS antenna formed by:
a second portion of the circumference of the bezel, wherein a first end of the second portion of the circumference of the bezel is collocated with the first end of the first portion of the circumference of the bezel,
a second portion of the circumference of the side wall aligned with the second portion of the circumference of the bezel, wherein a first end of the second portion of the circumference of the side wall is collocated with the first end of the first portion of the circumference of the side wall,
the first bezel connector, and
a third bezel connector positioned at a second end of the second portion of the circumference of the bezel and a second end of the second portion of the circumference of the side wall; and
a communication antenna configured to transmit and receive a communication wireless signal having a third frequency and to conduct a communication electronic signal having the third frequency, the communication antenna formed by
a third portion of the circumference of the bezel partially overlapping with the second portion of the circumference of the bezel, wherein a first end of the third portion of the circumference of the bezel is collocated with the first end of the first portion of the circumference of the bezel,
a third portion of the circumference of the side wall aligned with the third portion of the circumference of the bezel and partially overlapping with the second portion of the circumference of the side wall, wherein a first end of the third portion of the circumference of the side wall is collocated with the first end of the first portion of the circumference of the side wall,
the first bezel connector, and
a fourth bezel connector positioned at a second end of the third portion of the circumference of the bezel and a second end of the third portion of the circumference of the side wall.

16. The wrist-worn electronic device of claim 15, wherein the first bezel connector, the second bezel connector, and the third bezel connector are each electrically connected to the side wall and the bezel through the housing insulating ring.

17. The wrist-worn electronic device of claim 15, further comprising a location determining element receiving the first location electronic signal and the second location electronic signal, the location determining element configured to determine a geolocation of the electronic device according to data in the first location electronic signal and the second location electronic signal.

18. The wrist-worn electronic device of claim 15, further comprising:
a printed circuit board positioned above the lower surface of the lower housing,
a communication element receiving the communication electronic signal, the communication element configured to decode data from, and encode data to, the communication electronic signal associated with one or more communication protocols; and
an antenna tuning network positioned on the printed circuit board, electrically coupled with the fourth bezel connector and configured to cause frequency components of the communication electronic signal within a selected band of frequencies to pass from the bezel through the fourth bezel connector resulting in a signal path associated with the communication antenna that is shorter in length than a signal path associated with the second GNSS antenna.

19. The wrist-worn electronic device of claim 15, further comprising
a printed circuit board positioned above the lower surface of the lower housing,
a fifth bezel connector electrically connecting the printed circuit board to the bezel within the first portion of the circumference, wherein the fifth bezel connector conducts a first location electronic signal,
a sixth bezel connector electrically connecting the printed circuit board to the bezel within the third portion of the circumference, wherein the sixth bezel connector conducts a second location electronic signal and the communication electronic signal, and
a plurality of printed circuit board connectors electrically connecting conductors on the printed circuit board to the side wall,
wherein the fourth bezel connector is electrically connected to the bezel and the printed circuit board.

20. A wrist-worn electronic device comprising:
a lower housing including a lower surface and a side wall formed of electrically conductive material, the side wall having a top surface;
an upper housing opposing the lower housing, the upper housing including a bezel formed of an electrically conductive material, the bezel having a lower surface corresponding to the top surface of the side wall;

a housing insulating ring positioned between the top surface of the side wall and the lower surface of the bezel, the housing insulating ring formed from electrically insulating material and configured to provide an electrically insulated space between the side wall and the bezel;

a plurality of bezel connectors, each bezel connector providing an electrical connection to the bezel;

a first global navigation satellite system (GNSS) antenna configured to receive a first GNSS wireless signal having a first frequency and to conduct a first location electronic signal having the first frequency, the first GNSS antenna formed by:
  a first portion of a circumference of the bezel,
  a first portion of a circumference of the side wall aligned with the first portion of the circumference of the bezel,
  a first bezel connector positioned at a first end of the first portion of the circumference of the bezel and a first end of the first portion of the circumference of the side wall, and
  a second bezel connector positioned at a second end of the first portion of the circumference of the bezel and a second end of the first portion of the circumference of the side wall;

a second GNSS antenna configured to receive a second GNSS wireless signal having a second frequency and to conduct a second location electronic signal having the second frequency, the second GNSS antenna formed by:
  a second portion of the circumference of the bezel, wherein a first end of the second portion of the circumference of the bezel is collocated with the first end of the first portion of the circumference of the bezel,
  a second portion of the circumference of the side wall aligned with the second portion of the circumference of the bezel, wherein a first end of the second portion of the circumference of the side wall is collocated with the first end of the first portion of the circumference of the side wall,
  the first bezel connector, and
  a third bezel connector positioned at a second end of the second portion of the circumference of the bezel and a second end of the second portion of the circumference of the side wall;

a location determining element receiving the first location electronic signal and the second location electronic signal, the location determining element configured to determine a geolocation of the electronic device according to data in the first location electronic signal and the second location electronic signal;

a communication antenna configured to transmit and receive a communication wireless signal having a third frequency and to conduct a communication electronic signal having the third frequency, the communication antenna formed by
  a third portion of the circumference of the bezel partially overlapping with the second portion of the circumference of the bezel, wherein a first end of the third portion of the circumference of the bezel is collocated with the first end of the first portion of the circumference of the bezel,
  a third portion of the circumference of the side wall aligned with the third portion of the circumference of the bezel, wherein a first end of the third portion of the circumference of the side wall is collocated with the first end of the first portion of the circumference of the side wall,
  the first bezel connector, and
  a fourth bezel connector positioned at a second end of the third portion of the circumference of the bezel and a second end of the third portion of the circumference of the side wall; and a communication element receiving the communication electronic signal, the communication element configured to decode data from, and encode data to, the communication electronic signal associated with one or more communication protocols.

* * * * *